US010070299B2

(12) United States Patent
Panah

(10) Patent No.: US 10,070,299 B2
(45) Date of Patent: Sep. 4, 2018

(54) LOCAL AREA NETWORK MESHING

(71) Applicant: Facebook, Inc., Menlo Park, CA (US)

(72) Inventor: Ali Yazdan Panah, San Francisco, CA (US)

(73) Assignee: FACEBOOK, INC., Menlo Park, CA (US)

( * ) Notice: Subject to any disclaimer, the term of this patent is extended or adjusted under 35 U.S.C. 154(b) by 0 days.

(21) Appl. No.: 15/701,134

(22) Filed: Sep. 11, 2017

(65) Prior Publication Data
US 2017/0374701 A1   Dec. 28, 2017

Related U.S. Application Data

(63) Continuation of application No. 14/332,217, filed on Jul. 15, 2014, now Pat. No. 9,794,971.

(51) Int. Cl.
*H04W 8/00* (2009.01)
*H04W 76/14* (2018.01)
*H04W 84/12* (2009.01)
*H04W 76/15* (2018.01)

(52) U.S. Cl.
CPC .......... *H04W 8/005* (2013.01); *H04W 76/14* (2018.02); *H04W 76/15* (2018.02); *H04W 84/12* (2013.01)

(58) Field of Classification Search
CPC ..... H04W 8/005; H04W 76/14; H04W 76/15; H04W 84/12
See application file for complete search history.

(56) References Cited

U.S. PATENT DOCUMENTS

| 9,794,971 B2 | 10/2017 | Panah |
| 2013/0148643 A1 | 6/2013 | Abraham et al. |
| 2014/0003286 A1 | 1/2014 | Estevez et al. |
| 2014/0056209 A1 | 2/2014 | Park et al. |
| 2014/0071870 A1 | 3/2014 | Abraham et al. |
| 2014/0126461 A1 | 5/2014 | Ghosh et al. |

(Continued)

OTHER PUBLICATIONS

Non-Final Office Action dated Sep. 23, 2016 for U.S. Appl. No. 14/332,217 for Panah, A. filed Jul. 15, 2014.

(Continued)

*Primary Examiner* — Ian N Moore
*Assistant Examiner* — Ronald H Davis
(74) *Attorney, Agent, or Firm* — Keller Jolley Preece

(57) ABSTRACT

Some embodiments includes a method of forming a local area mesh network at a computing device. The method can include: receiving a connection request from a first neighbor device utilizing a Wi-Fi Direct (WFD) discovery protocol; forming a first peer-to-peer (P2P) connection with the first neighbor device utilizing WFD, wherein the computing device is set as a group owner of the first P2P connection; generating a notice of absence schedule to send to the first neighbor device indicating suspension intervals of the first P2P connection during which the computing device is suspended from being the group owner of the first P2P connection; forming a second P2P connection with a second neighbor device utilizing WFD, wherein the second neighbor device is set as a group owner of the second P2P connection, wherein the first P2P connection and the second P2P connection constitute part of a mesh communication network.

17 Claims, 9 Drawing Sheets

(56) References Cited

U.S. PATENT DOCUMENTS

2015/0023183 A1* 1/2015 Ilsar ................... H04W 48/16
370/244
2015/0092639 A1 4/2015 Jia et al.
2016/0021688 A1 1/2016 Panah

OTHER PUBLICATIONS

Notice of Allowance dated Jun. 16, 2017 of U.S. Appl. No. 14/332,217 by Panah, A., filed Jul. 15, 2014.
U.S. Appl. No. 14/332,217 for Panah, A. filed Jul. 15, 2014.

* cited by examiner

LOCAL AREA NETWORK MESHING

CROSS-REFERENCES TO RELATED APPLICATIONS

This application is a continuation of U.S. patent application Ser. No. 14/332,217, filed on Jul. 15, 2014, and entitled "LOCAL AREA NETWORK MESHING," the disclosure of which is hereby incorporated herein in its entirety by reference.

RELATED FIELD

At least one embodiment of this disclosure relates generally to a networking system, and, in particular, to a local area network (LAN) communication system utilizing Wi-Fi Direct™ (WFD).

BACKGROUND

Wi-Fi Direct is a wireless local area network (WLAN) technology according to a Wi-Fi standard that enables Wi-Fi enabled devices to connect with each other without requiring a wireless router or other network service equipment and to communicate at typical Wi-Fi speeds. WFD has the ability to connect devices even when they are from different manufacturers. A WFD-enabled device can negotiate a link with another WFD-enabled device with one of the devices acting as a limited wireless access point to the other device and thus forming a "WFD group".

The WFD group can be expanded to include other devices. The WFD groups are designed to expand as star networks. Under the WFD standard, a device acting as a "group owner" of a star network is connected to several stations as a limited access point of the stations. However, a star network is inherently limited by its inability to expand beyond a physical area thus limiting the reach of the network.

The Wi-Fi Direct protocol is a technology that allows you to find nearby Wi-Fi Direct devices and form a WFD group to communicate over a peer-to-peer link without wireless access points (base stations) in the infrastructure. The Wi-Fi Direct protocol enables multiple computing devices, also referred to as "stations," to establish a peer-to-peer star network. For example, the star network can include four member stations. When forming the star network 100 with the Wi-Fi Direct protocol, the member stations can elect one station amongst themselves as a "group owner."

In a WFD group (e.g., the star network), the group owner works as an access point to other devices and enables the other devices to join the group as the group owner's clients. A group can be created either by negotiation between two devices or, in an autonomous mode, by a single group owner device. In a negotiation-based group creation, two devices compete by publishing respective group owner intent values. The device with the higher intent value then becomes the group owner of the WFD group, while the other device becomes a group client. In an autonomous group creation, a device becomes the group owner by itself without any group client. A Wi-Fi Direct enabled device can join an existing group by associating itself with the group owner, as long as the allowed number of clients is not exceeded.

Figure 1:
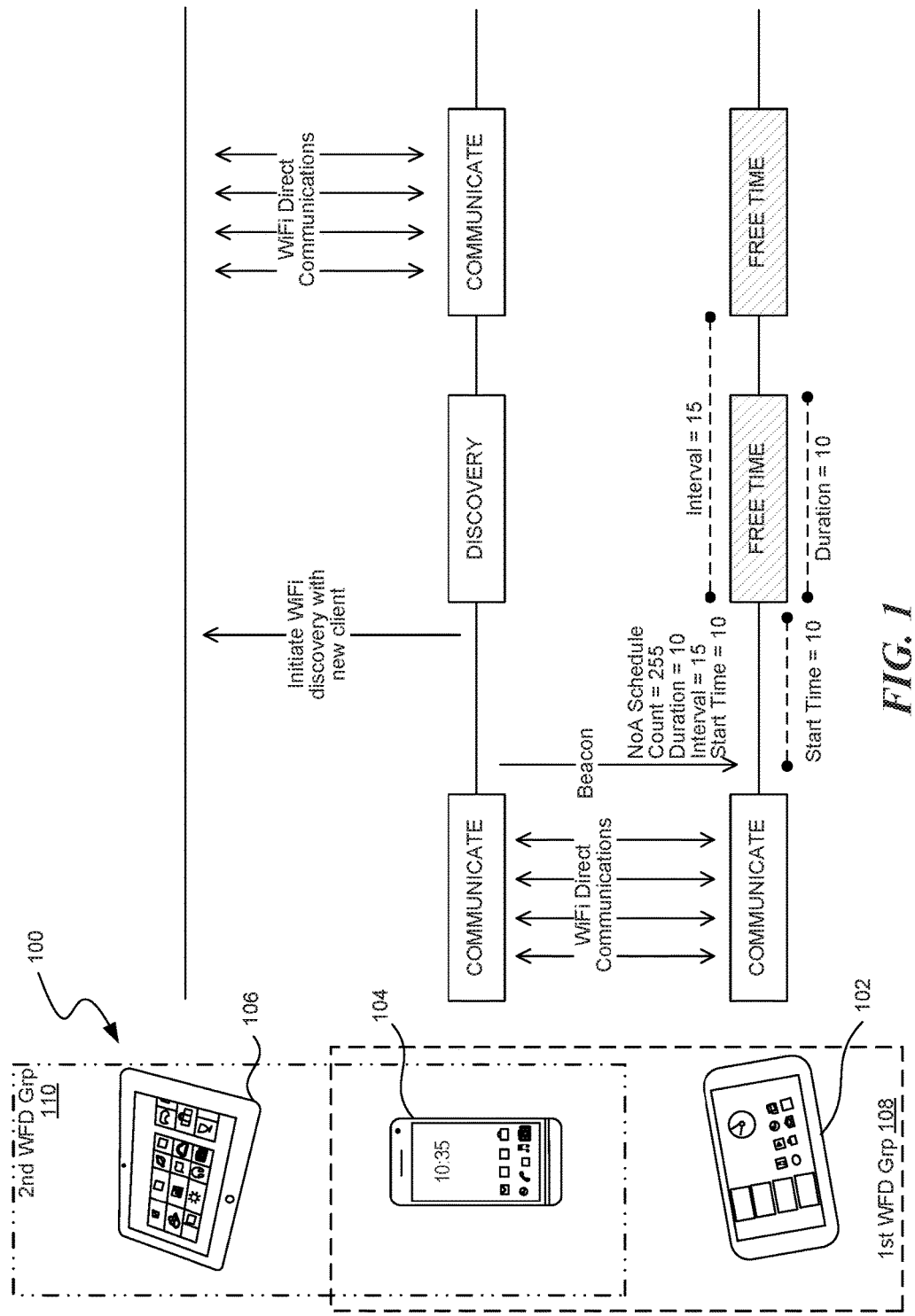
FIG. 1 is a data flow timeline illustrating an example of a method for establishing a mesh network via multiple WFD groups, in accordance with various embodiments.

The figures depict various embodiments of this disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

Embodiments are described for enabling peer-to-peer (P2P) communication between computing devices. The P2P communication implements a mesh network by repurposing a feature of the Wi-Fi Direct (WFD) standard. The WFD standard enables devices to connect with each other by establishing a star network, also referred to as a "WFD group." Normally, a device can be an "owner" or a client of a WFD group, and cannot be part of more than one WFD group. The disclosed P2P communication system utilizes a power saving feature of the WFD protocol, known as the "Notice of Absence" (NoA), to temporarily pause a first WFD group such that the group "owner" of the first WFD group can become a client of a second WFD group. The NoA protocol is normally used to save energy by temporarily shutting down a computing device acting as the group owner of a WFD group. However, in accordance with various embodiments, the NoA protocol is used to open a temporal window of opportunity for a device to be part of multiple WFD groups.

The P2P communication system can orchestrate suspension periods across devices of a mesh network (e.g., including one or more mesh network branches or chains). For example, this orchestration can be enabled by propagating suspension interval schedules from one node of the mesh network to another when forming the mesh network. Using this methodology, intermediary nodes (i.e., nodes that are not at the edges of the mesh network) can participate in two or more of WFD groups and propagate data between the WFD groups. For example, by temporarily scheduling a first WFD group to pause, a member station of the first WFD group can participate in a different WFD group during the period of suspension of the first the WFD group. In this manner, the WFD-enabled devices can form a sequence of P2P nodes to relay messages within a chain or within time-multiplexed branches.

A WFD mesh network is formed by one or more WFD groups. Each WFD group has one Group Owner (GO) and one or more Clients (CL). The standard for the WFD protocol specifies that no more than one GO is allowed per WFD group. The WFD protocol also does not allow changing of the GO assignment within any WFD group.

While these restrictions normally limit use of the WFD protocol to establishing P2P star networks, the disclosed P2P communication system advantageously allows for mesh network architectures to form by suspending WFD groups using the NoA mechanism. For example, the NoA mechanism enables a GO to announce periods where the GO will be "absent" to its WFD group. The GO can make these announcements by transmitting a NoA scheduling beacon. The NoA scheduling beacon can establish a one-time suspension period or repeating suspension periods. The NoA scheduling beacon can be transmitted periodically or once to establish a cyclic suspension schedule. The NoA scheduling beacon can be re-transmitted with or without adjustments to one or more parameters of the suspension periods.

Various embodiments include a process of establishing a chain of computing stations, each with WFD capability. The chain of computing stations are linked together in a chain-like pathway or a branching pathway, thus enabling the relaying of packets over long distances. In one example, three computer stations can form an ad hoc mesh network by coordinating NoAs of multiple WFD groups that form a mesh network.

Two of these computer stations can form a first WFD group and establish a NoA schedule for the first WFD group. Once the NoA schedule for a first WFD group is established, the GO of the first WFD group does not expect any packets from its client station during the suspension periods. Ordinarily, the NoA mechanism is devised in the WFD protocol to allow the GO to go into intermittent "sleep" modes for power saving. However, here the same mechanism instead enables the GO of the first WFD group to make a new WFD connection (e.g., an additionally linked WFD group). The GO of the first WFD group can use a NoA beacon to initiate a sleep cycle for its clients; however instead of going into sleep mode, the GO instead initiates a new search for WFD-enabled devices in its vicinity. The search mechanism may use the predefined WFD discovery protocol. The GO then selects another station to connect with that is not its existing client in the first WFD group. The GO then forms the new connection, and thus a new WFD group, with the newly discovered station, and delegates the new station as the GO of the new connection (i.e., the new WFD group). The search mechanism and the formation of the new connection can occur within one or more the suspension periods established for the first WFD group. Outside of the suspension periods, the GO can communicate with its client in the first WFD group.

A "trunk" or primary node in a WFD mesh network chain or branch is capable of connecting to (or being) a primary access point in a Wi-Fi network (or have another type of connection to a primary network, e.g., the Internet). By creating multiple such chains, the P2P communication system can create a mesh network extending the reach of the primary network using the WFD protocol. The disclosed P2P communication system is advantageous in providing extension of network reach as well as resistance to equipment failures by rerouting using different P2P chains or branches.

Enabling WFD technology to establish a mesh network is advantageous because the WFD technology has one of the faster discovery protocols and higher wireless bandwidth as compared to other P2P connection technologies, for example, Bluetooth. Utilizing WFD to form a mesh structure also advantageously creates a communication network that is resistant to outages and has a much wider coverage than the star network that the WFD standard is originally intended for. These advantages enable deployment of a WFD-based P2P mesh network in both rural and urban areas. While the bandwidth of the mesh networks may be limited by the time division multiplexing, the extended coverage and the fail-safe recovery capability of the mesh network advantageously provide stable connectivity to people without high infrastructure investment.

FIG. 1 is a data flow timeline illustrating an example of a method for establishing a mesh network 100 via multiple WFD groups, in accordance with various embodiments. The mesh network 100 may include a first computing device 102, a second computing device 104, and a third computing device 106. The computing devices 102, 104, and 106 can be smart phones, tablets, laptop computers, smart TVs, desktop computers, or any combination thereof.

In the illustrated example, the first computing device 102 has already established a first WFD group 108 with the second computing device 104. The first WFD group 108 has the second computing device 104 being the group owner. The first WFD group 108 enables data to flow between the first computing device 102 and the second computing device 104. The mesh network 100 can expand the mesh network 100 by joining the first WFD group 108 with an existing second WFD group or by forming a second WFD group 110.

In the illustrated example, the mesh network 100 is expanded by scheduling group suspension periods for the first WFD group 108, during which time the second computing device 104 can form the second WFD group 110. Members of the first WFD group 108 can perform actions ordinarily limited by the WFD protocol when the members are part of a WFD group (e.g., actions such as communicating with another WFD group or performing discovery mechanism to establish another WFD group). For example, FIG. 1 illustrates various activities by the first computing device 102 and the second computing device 104 during the suspension periods (e.g., the blocks labeled "FREE TIME" or the blocks labeled "DISCOVERY" and "COMMUNICATE"). This scheduling is accomplished by the second computing device 104 sending a Notice of Absence beacon message to the first computing device 102. The Notice of Absence beacon message specifies a schedule to suspend the first WFD group 108 periodically for intervals of time.

For example, the Notice of Absence beacon message can include a "count" parameter that specifies how many of the group suspension periods to schedule and a "duration" parameter that specifies how long each group suspension period is. According to the Wi-Fi direct standard, a particular value (e.g., 155) of the "count" parameter specifies that the group suspension periods repeat indefinitely. The Notice of Absence beacon message also include an "interval" parameter that specifies the length of time cycle between beginnings of each group suspension period. The NoA beacon message further includes a "start time" parameter that specifies when the periodic group suspension periods begin.

The NoA beacon message initiates the periodic suspension periods for the first WFD group 108. During the periodic suspension periods, the second computing device 104 suspends its connection to the first computing device 102 (e.g., the second computing device 104 does not expect any communication to or from the first computing device 102). During the suspension periods, both the first computing device 102 and the second computing device 104 can operate as if they are not committed to the first WFD group 108 already.

For example, during one or more of the suspension periods, the second computing device 104 can initiate a WFD discovery mechanism to find one or more other devices in its vicinity. The second computing device 104 can select the third computing device 106 in its vicinity to establish the second WFD group 110. While forming the second WFD group 110, the second computing device 104 and the third computing device 106 can perform a GO negotiation. To create the second WFD group 110 where the second computing device 104 is not the group owner, the second computing device 104 sets a group owner intent value (e.g., a priority parameter) to a value corresponding to least intent to be the group owner, e.g., 0. The second WFD group 110 is established with the third computing device 106 as the GO of the group.

As a result, a mesh network is established with a link between the first computing device 102 and the second computing device 104 via the first WFD group 108 and a link between the second computing device 104 and the third computing device 106 via the second WFD group 110. In this case, the first computing device 102 may be considered the mesh head and the third computing device 106 may be considered the mesh tail. In this example, the first computing device 102 is a client of the first WFD group 108; the second computing device 104 is both a client in the second WFD group 110 and the group owner of the first WFD group 108; and the third computing device 106 is the group owner of the second WFD group 110. The same process as described above can be repeated for the third computing device 106 to further connect with other devices in its vicinity, and thus expanding the mesh network 100. In that case, the third computing device 106 would serve as a client of a new WFD group.

Figure 2:
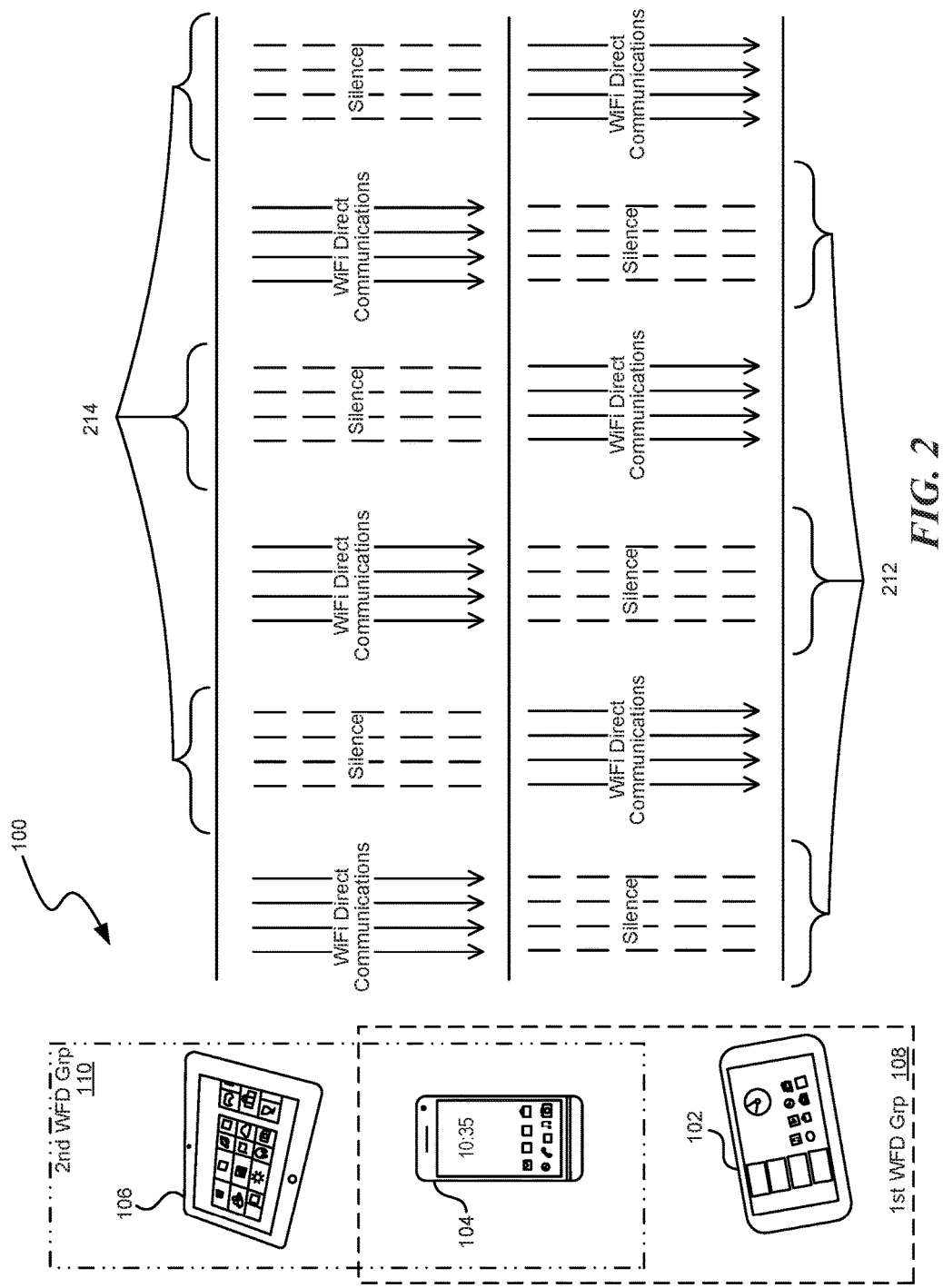
FIG. 2 is a data flow timeline illustrating a method of communicating via the mesh network of FIG. 1, in accordance with various embodiments.

FIG. 2 is a data flow diagram illustrating a method of communicating via the mesh network 100 of FIG. 1, in accordance with various embodiments. The mesh network 100 includes the first computing device 102, the second computing device 104, and the third computing device 106. As shown, the first computing device 102 and the second computing device 104 forms the first WFD group 108; and the second computing device 104 and the third computing device 106 forms the second WFD group 110. The multiple WFD groups can be formed based on the methodology described in FIG. 1.

The first WFD group 108 may be configured by NoA beacons to cycle through suspension periods 212. The second WFD group 110 may be configured by NoA beacons to cycle through suspension periods 214. In this example, the second computing device 104 is both the group owner of the first WFD group 108 and a client of the second WFD group 110. In order for the second computing device 104 to operate both WFD groups, the computing devices are configured to time delay their communication operations with each other based on the suspension periods 212 corresponding to the first WFD group 108 and the suspension periods 214 corresponding to the second WFD group 110. For example, the second computing device 104 can communicate with the first computing device 102 during the suspension periods 214 corresponding to the second WFD group 110. As another example, the second computing device 104 can communicate with the third computing device 106 during the suspension periods 212 corresponding to the first WFD group 108. This time division multiplexing (TDM) communication is configured based on the NoA scheduling. The NoA scheduling allows for forward and backward data flow in a time-multiplexed manner.

In various embodiments, the mesh network 100 can further evolve after it is established. For example, one of the computing devices can voluntarily sever its connection with another one of the computing devices in the mesh network 100. This may occur due to breach of security, load-balancing considerations, network performance considerations, power saving considerations, or other computing related or network related considerations. A computing device within the mesh network 100 can identify (e.g., via WFD discovery protocol) a new potential connection before the computing device severs one of its existing connections. For example, the computing device can compare network performance between the new potential connection and the existing connections and determine to substitute an existing connection with the new potential connection to improve network performance.

For another example, one of the computing device can involuntarily sever its connection with another one of the computing devices in the mesh network 100. This may occur due to hardware failure, software failure, wireless obstruction, weak signal, or other external conditions that breaks a connection of one of the WFD groups. In this case, in response to the involuntary breaking of a connection, the computing devices involved can identify potential connections with known devices or discover additional devices in the computing devices' vicinities during suspension periods of the still-connected WFD group. These computing devices can then reestablish the mesh network 100 with the potential connections.

In the illustrated example, the mesh network 100 is established as a chain. However, a computing device can also time divide its time amongst more than just two WFD groups (thus establishing a "communication branch" instead of a chain). For example, instead of dividing its time between the suspension periods 212 and the suspension periods 214, the second computing device 104 can time split its time amongst three or more sets of suspension periods to enable communication with three or more computing devices via three or more WFD groups.

In some embodiments, peer-to-peer communication between computing devices in a WFD group is bidirectional within its allotted time (according to the suspension periods of neighboring WFD groups). In other embodiments, peer-to-peer communication between computing devices in a WFD group is time multiplexed such that there is an allotted time for each direction of communication.

Figure 3:
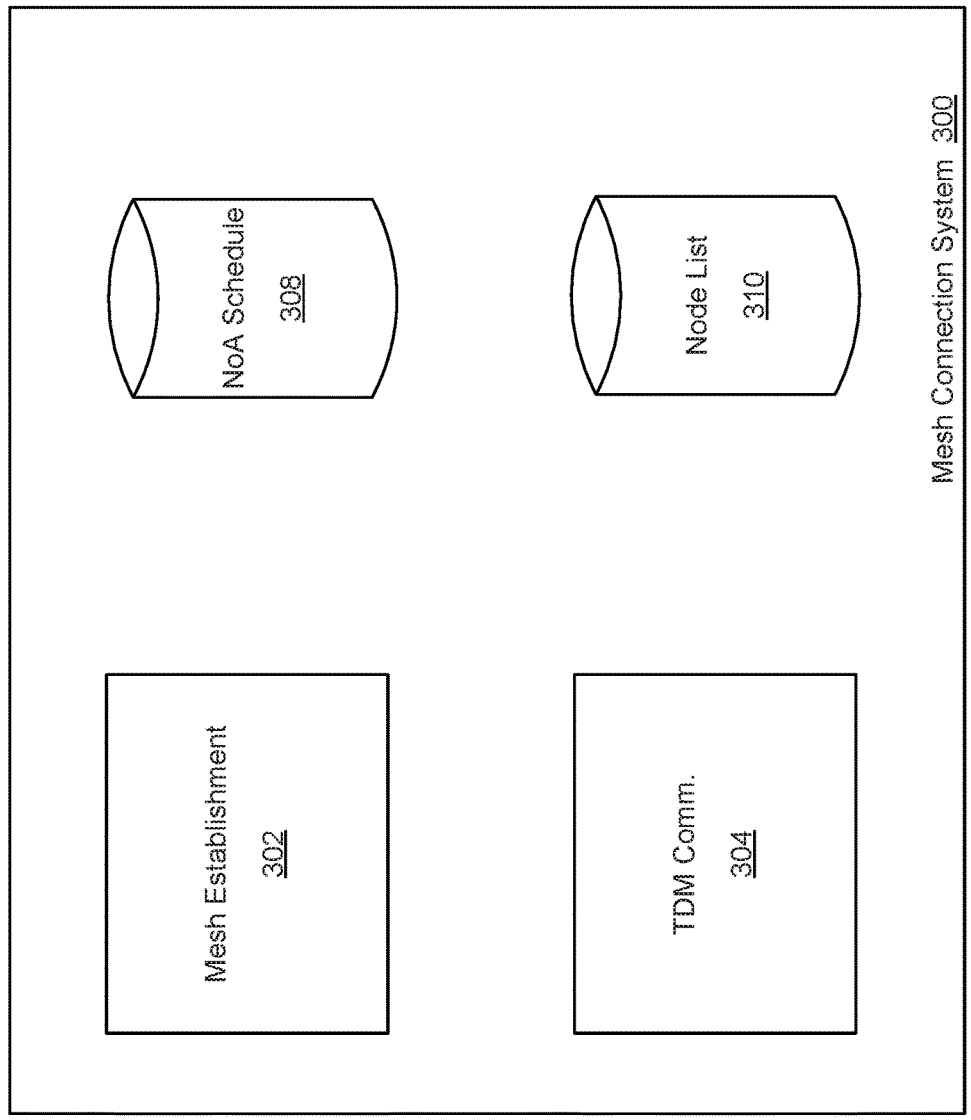
FIG. 3 is a block diagram of a mesh connection system for establishing a mesh network node within a mesh network utilizing the WFD protocol, in accordance with various embodiments.

FIG. 3 is a block diagram of a mesh connection system 300 for establishing a mesh network node within a mesh network (e.g., the mesh network 100 of FIG. 1) utilizing the WFD protocol, in accordance with various embodiments. The mesh connection system 300 can be the computing device 700 of FIG. 7. The mesh connection system 300 can include a mesh establishment module 302, a time division multiplexing (TDM) communication module 304, a NoA schedule store 308, and a node list store 310.

The mesh establishment module 302 provides instructions to the mesh connection system 300 to establish a mesh network, for example, the mesh network 100 of FIG. 1 and FIG. 2. The mesh establishment module 302 can be configured with a parameter regarding the size of the mesh network to build. The mesh establishment module 302 can be configured to connect with neighboring devices to establish a mesh network chain that eventually connects with an external network of interest. The external network of interest, for example, can be the Internet or any other type of a private network.

Figure 5:
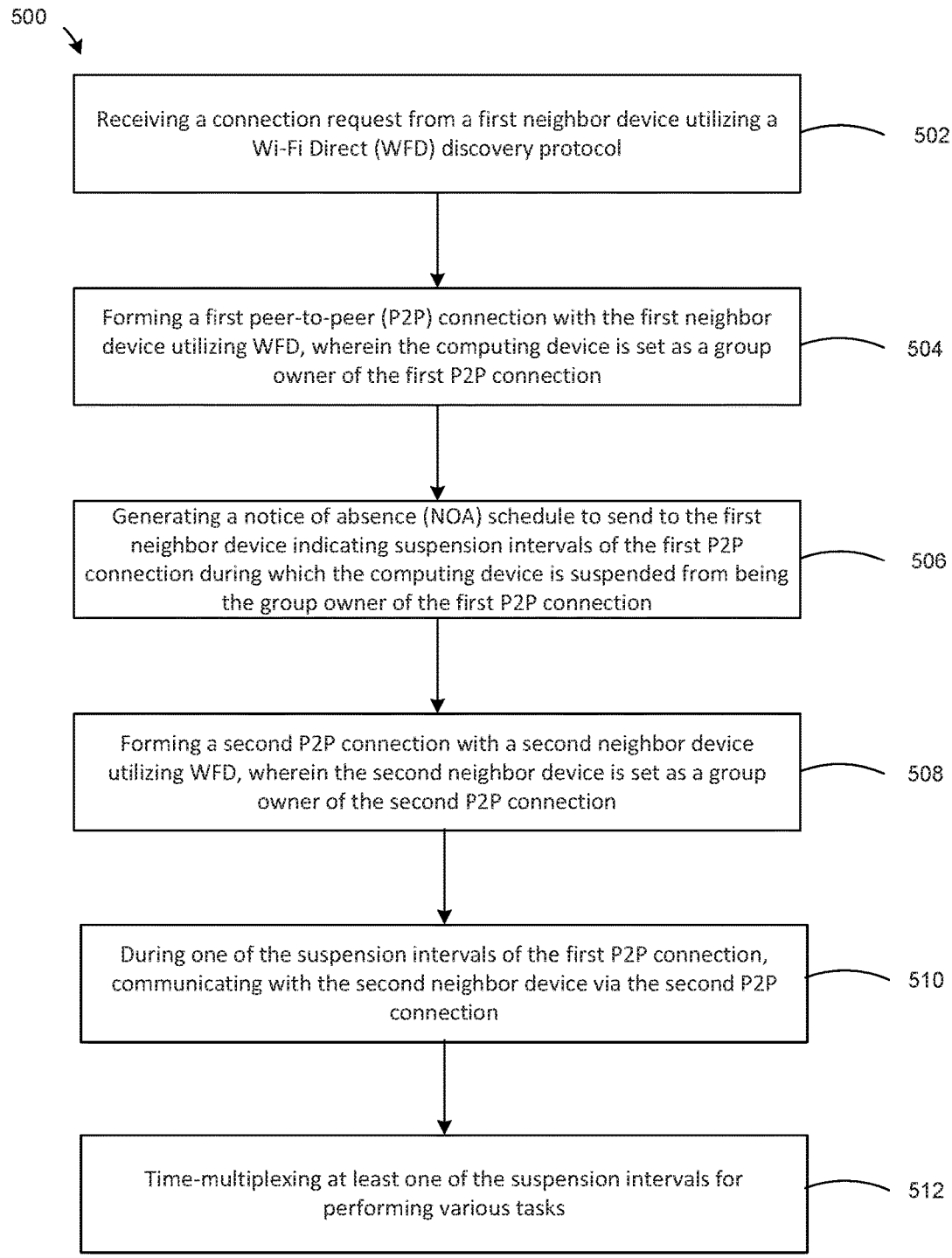
FIG. 5 is a flow chart of a method of establishing a P2P mesh network utilizing WFD, in accordance with various embodiments.

When establishing the mesh network, an instance of the mesh establishment module 302 can establish a WFD group with a neighboring WFD-enabled device following the methodologies described in FIG. 1 and/or in FIG. 5. This instance of the mesh establishment module 302 can then communicate with another instance of the mesh establishment module 302 on the neighboring device. For example, the instances can communicate and share scheduling information stored in the NoA schedule store 308. The NoA schedule store 308 can include suspension periods for existing WFD group(s) that the mesh connection system 300 is part of. For another example, the instances can communicate and share device identity information and information regarding how devices in the mesh network are connected. The node list store 310 identifies how devices in a mesh network are connected and the identities of these devices. For yet another example, the instances can communicate and share mesh network objective information (e.g., which external network to connect to).

The TDM communication module 304 provides instructions to the mesh connection system 300 to communicate data between devices that are reachable by the mesh network (e.g., the mesh network that is at least partially established by the mesh establishment module 302). For example, the TDM communication module 304 can support communication between the mesh connection system 300 and the external network through the mesh network, communication between the mesh connection system 300 and another device in the mesh network, communication between two devices in the mesh network by routing through the mesh connection system 300, or communication between another device in the mesh network and the external network by routing through the mesh connection system 300.

The TDM communication module 304 can be configured to implement time division multiplexing for communication operations. For example, the TDM communication module 304 can identify a destination of a communication request, determine which WFD group (that the mesh connection system 300 is part of) to send the communication request (based on the node list store 310), and postpone or delay the communication request based on the NoA schedule (which can be generated relative to the NoA schedules of other WFD groups) corresponding to that WFD group according to the NoA schedule store 308.

In some embodiments, the TDM communication module 304 can further delay the communication request based on a functional division of communication operation types. For example, based on the NoA schedule of the WFD group that can reach the destination, the TDM communication module 304 can identify an active time period of the WFD group. Within that active time period, a sub-interval can be allocated for sending out messages (e.g., the communication request) and another sub-interval can be allocated for receiving messages (e.g., the communication request), and yet another sub-interval can be allocated for discovering alternative mesh network nodes to expand the mesh network or to replace an existing connection.

The mesh connection system 300 can be implemented by a computer system with at least a processor and a non-transitory memory module. The mesh connection system 300 can be implemented by a computer system according to FIG. 7. The mesh connection system 300 can perform one or more methods of establishing a mesh network and utilizing the mesh network to communicate. The methods can be implemented by data storages (e.g., "stores") and modules described herein. The modules can be implemented as hardware components, software components, or any combination thereof. For example, the modules described can be software components implemented as instructions on a non-transitory memory module capable of being executed by the processor. For another example, the methods and other techniques introduced herein can be implemented by programmable circuitry programmed or configured by software and/or firmware, or they can be implemented by entirely by special-purpose "hardwired" circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

Each of the modules or data storages can operate individually and independently of other modules and/or data storages. Some or all of the modules can be combined as one module. Some or all of the data storages can be combined as one data storage. A single module can also be divided into sub-modules, each performing separate method step or method steps of the single module. A single data storage can also be divided into sub-storages, each containing a portion of the dataset of the single data storage. The modules can share access to a memory space. One module can access data accessed by or transformed by another module. The modules can be considered "coupled" to one another if they share a physical connection or a virtual connection, directly or indirectly, allowing data accessed or modified from one module to be accessed in another module. The mesh connection system 300 can include additional, fewer, or different modules for various applications.

The storages or "stores", described can be implemented as hardware components or portions of hardware components for storing digital data. Each of the storage can be a single physical entity or distributed through multiple physical devices. Each of the storage can be on separate physical devices or share the same physical device or devices.

Figure 4A:
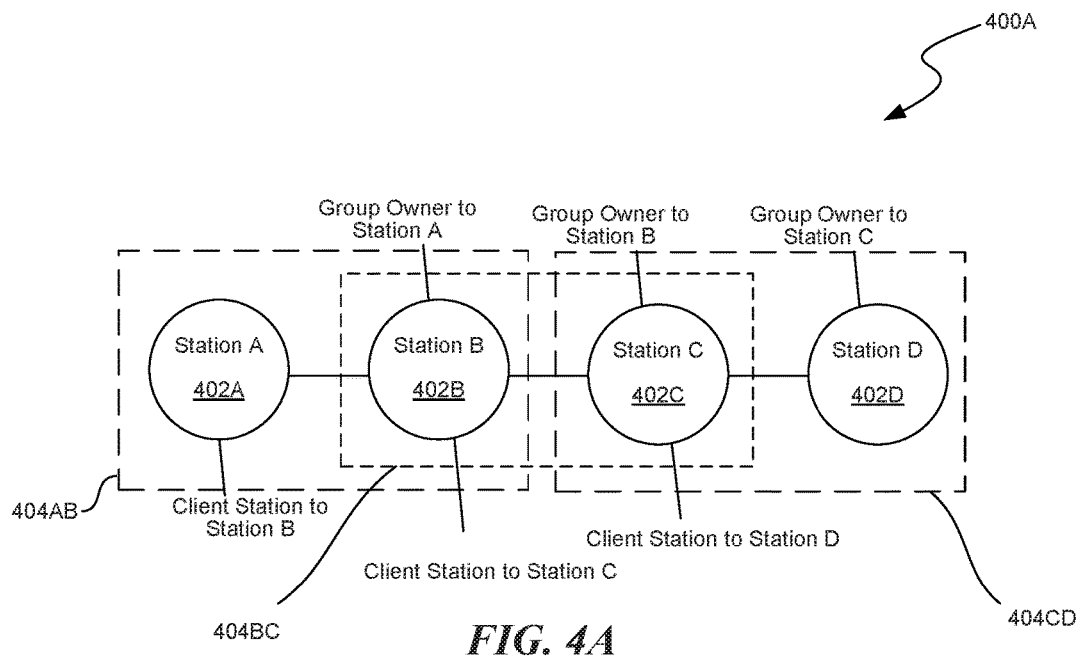
FIG. 4A is a network layout diagram of a first example of a mesh network branch, in accordance with various embodiments.

FIG. 4A is a network layout diagram of an example of a mesh network branch 400A, in accordance with various embodiments. The mesh network branch 400A is formed by a chain of member stations, e.g., a station 402A, a station 402B, a station 402C, and a station 402D, collectively as the "stations 402." In this example, the station 402A is a client station to the station 402B in a WFD group 404AB consisting of and formed by the stations 402A and 402B; the station 402B is the group owner in the WFD group 404AB and a client station to the station 402C in a WFD group 404BC consisting of and formed by the stations 402B and 402C; the station 402C is the group owner in the WFD group 404BC and a client station to the station 402D in a WFD group 404CD consisting of and formed by the stations 402C and 402D; and the station 402D is the group owner in the WFD group 404CD.

In one example, the mesh network branch 400A can first form the WFD group 404AB between the station 402A and the station 402B. When forming the WFD group 404AB, the station 402A and the station 402B can negotiate a first time multiplex schedule (e.g., time division multiplexing) utilizing NoA beacons such that the WFD group 404AB is suspended periodically in accordance with the first time multiplex schedule. During one or more of the suspension periods, the station 402B can discover additional connections to expand the mesh network branch 400A, for example, by forming the WFD group 404BC with the station 402C. Subsequently, the station 402B and the station 402C can negotiate a second time multiplex schedule based on the first time multiplex schedule such that the WFD group 404BC is active at least for a portion of time when the WFD group 404AB is suspended. This process can be repeated to form the WFD group 404CD. While in the above example the WFD groups are formed in a given order, in some embodiments, the WFD groups can also be formed in other orders as well.

Figure 4B:
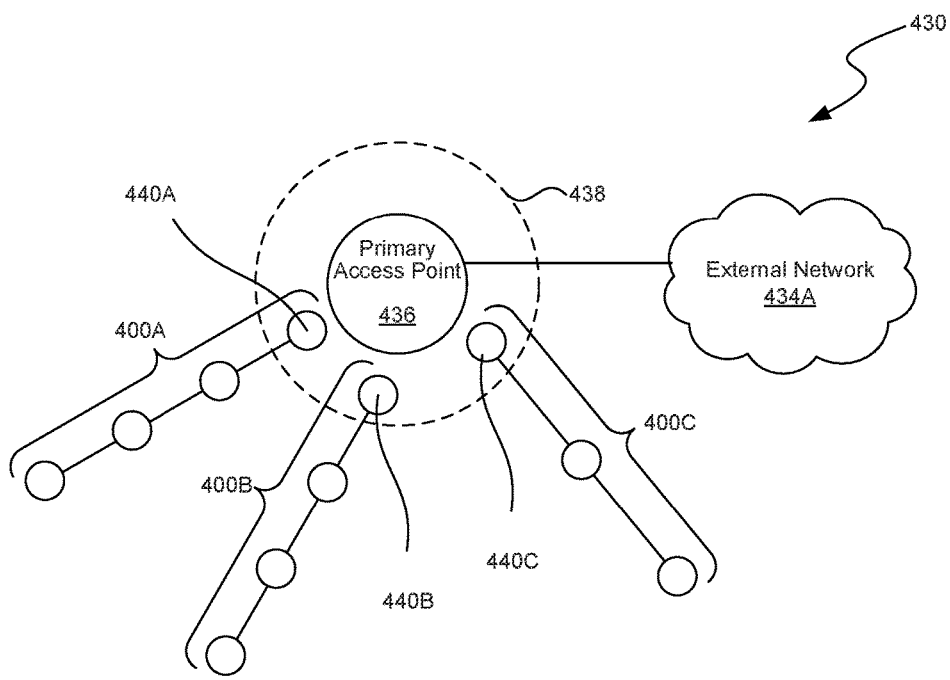
FIG. 4B is a network layout diagram of an example of an expanded mesh network, in accordance with various embodiments.

FIG. 4B is a network layout diagram of an example of an expanded mesh network 430, in accordance with various embodiments. The expanded mesh network 430 is connected to an external network 434A via a primary access point 436. That is, the primary access point 436 can be directly connected to the external network 434A and can route data to and from the external network 434A through other means. For example, the external network 434A can be a private Ethernet network or the Internet. The primary access point 436 can be a member of a mesh network branch of the expanded mesh network 430 or a network device that connects to one or more mesh network branches of the expanded mesh network 430. For example, the primary access point 436 can be a wireless router that provides network connectivity within a service region 438.

One or more stations that are members of mesh network branches (e.g., the mesh network branch 400A of FIG. 4A, a mesh network branch 400B, and a mesh network branch 400C, collectively the "mesh network branches 400") can be located within the service region 438. For example, these member stations can be mesh tail stations (e.g., mesh tail station 440A, mesh tail station 440B, and mesh tail station 440C, collectively the "mesh tail stations 440") of their respective mesh network branches. The primary access point 436 can thus extend Internet connectivity beyond the service region 438 by communicating with member stations of the mesh network branches 400 outside of the service region 438 via the mesh tail stations 440 within the service region 438.

Figure 4C:
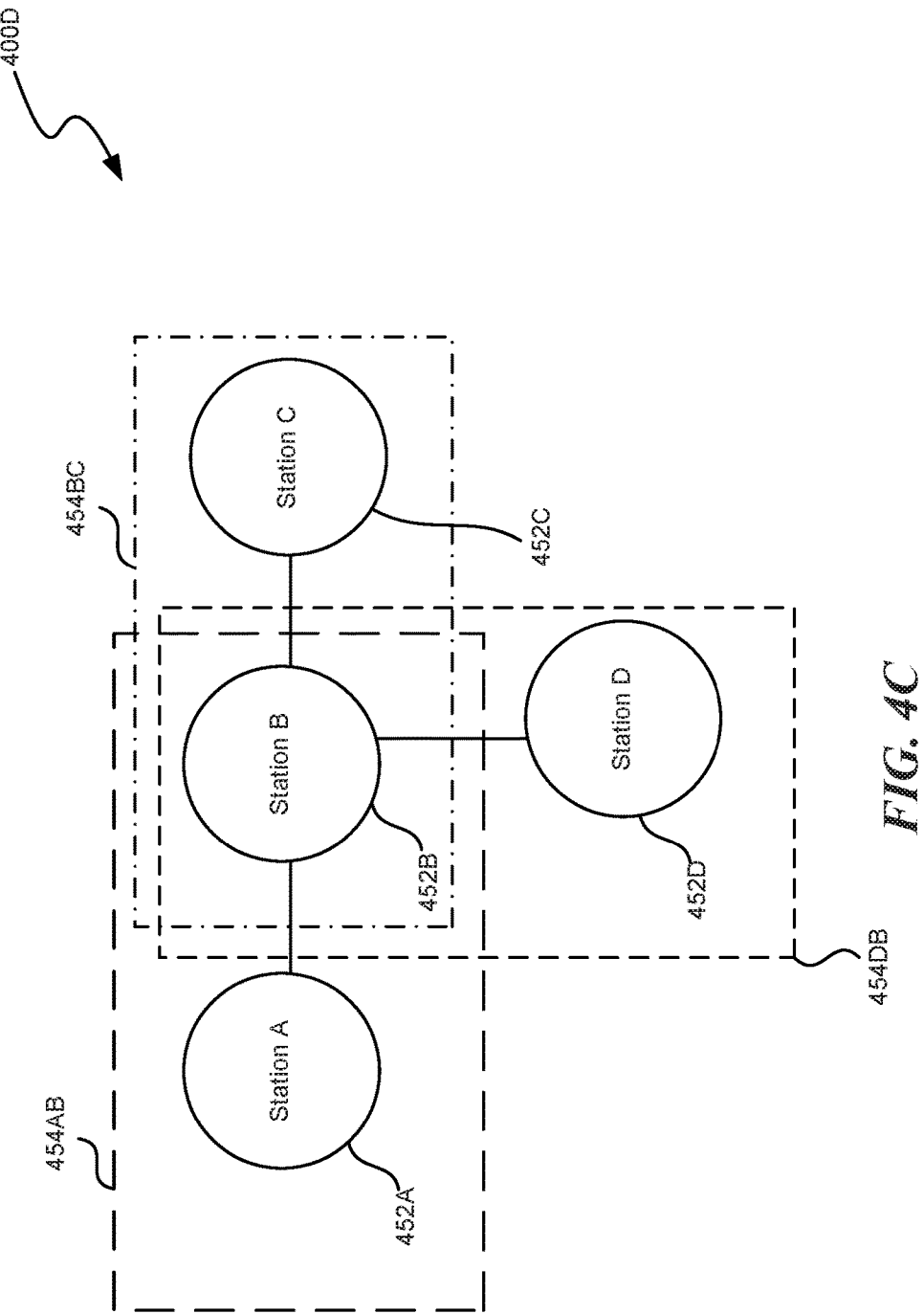
FIG. 4C is a network layout diagram of a second example of a mesh network branch, in accordance with various embodiments.

FIG. 4C is a network layout diagram of a second example of a mesh network branch 400D, in accordance with various embodiments. The mesh network branch 400D is formed from member stations, e.g., a station 452A, a station 452B, a station 452C, and a station 452D, collectively as the "stations 452." In this example, the station 452A is a client station to the station 452B in a WFD group 454AB consisting of and formed by the stations 452A and 452B; the station 452D is also a client station to the station 452B but in a separate WFD group 454DB consisting of and formed by the stations 452D and 452B; the station 452B is the group owner in the WFD group 454AB and the WFD group 454 DB and a client station to the station 452C in a WFD group 454BC consisting of and formed by the stations 452B and 452C; the station 452C is the group owner in the WFD group 454BC.

In some embodiments, the WFD group 454AB and the WFD group 454DB can be the same WFD group. For example, the station 452B can be the group owner to the station 452A and the station 452D in the same WFD group.

In one example, the mesh network branch 400D can first form the WFD group 454AB between the station 452A and the station 452B. When forming the WFD group 454AB, the station 452A and the station 452B can negotiate a first time multiplex schedule (e.g., time division multiplexing) utilizing NoA beacons such that the WFD group 454AB is suspended periodically in accordance with the first time multiplex schedule. During one or more of the suspension periods, the station 452B can discover additional connections to expand the mesh network branch 400D, for example, by forming the WFD group 454DB with the station 452D. Subsequently, the station 452B and the station 452D can negotiate a second time multiplex schedule based on the first time multiplex schedule such that the WFD group 454BC is active for at least a portion of time when the WFD group 404AB is suspended. In some embodiments, where the station 452B can preserve intervals of time when the station 452B is free from its membership to either the WFD group 454AB or the WFD group 454DB for additional discovery.

For example, during one of the preserved intervals of time, the station 452B can form the WFD group BC with the station 452C. Subsequently, the station 452B and the station 452C can negotiate a third time multiplex schedule based on the first time multiplex schedule and the second time multiplex schedule such at most one of the WFD groups that the station 452B is part of is active at any given time.

In another example, some of the WFD groups of the mesh network branch 400D can be formed with more than two members. For example, in the case that the WFD group 454AB is the same as the WFD group 454DB, a single WFD group can include two client stations (e.g., the station 452A and the station 452D) and the group owner (e.g., the station 452B). In that case, the three stations can negotiate for station 452B to be the group owner (e.g., by determining that the station 452B is connected to or is more likely to connect to an external network). The three stations can also negotiate for a first time multiplex schedule of when the entire WFD group is operating and when the entire WFD group is suspended.

The mesh network branch 400D is at least different from the mesh network branch 400A in that one of its member stations is the group owner to two other stations (e.g., the station 452B being both the group owner to the station 452A and the station 452D), either by being the group owner of two WFD groups or forming a WFD group of more than one client stations.

Figure 4D:
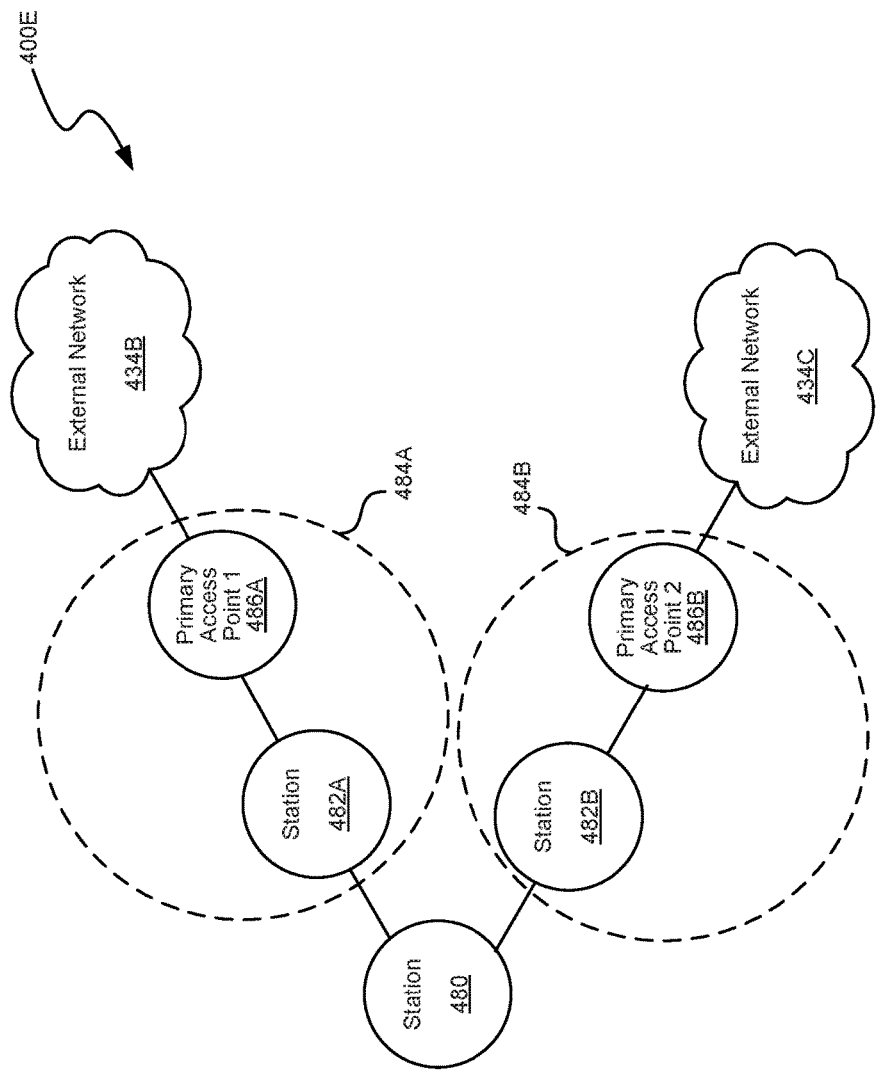
FIG. 4D is a network layout diagram of an example of two mesh network branches intersecting, in accordance with various embodiments.

FIG. 4D is a network layout diagram of an example of two mesh network branches intersecting, in accordance with various embodiments. In this example, a first mesh network branch 400E and a second mesh network branch 400F exist. The first mesh network branch 400E includes a mesh head station 480 and a mesh tail station 482A. The mesh tail station 482A is within a first service region 484A of a first primary access point 486A. The first primary access point 486A enables the first mesh network branch 400E to connect with an external network 434B (e.g., a local Ethernet, cable, optical, or microwave network or the Internet). The second mesh network branch 400F includes the mesh head station 480 and a different mesh tail station 482B. The mesh tail station 482B is within a second service region 484B of a second primary access point 486B. The second primary access point 486B enables the second mesh network branch 400F to connect with an external network 434C. In the illustrated example, the mesh head station 480 has access to both the external network 434B and the external network 434C through two different mesh network branches. This can be accomplished if the mesh head station 480 is part of both a WFD group in the first mesh network branch 400E and a WFD group in the second mesh network branch 400F. In this case, the mesh head station 480 can be the client station to both WFD groups. For example, the mesh head station 480 can time multiplex using the NoA scheduling to share its time between communicating through the first mesh network branch 400E and through the second mesh network branch 400F.

FIG. 5 is a flow chart of a method 500 of establishing a P2P mesh network utilizing WFD, in accordance with various embodiments. The method 500 may be executed by a computing device (e.g., one of the computing devices 102, 104, or 106 of FIG. 1 or the mesh connection system 300 of FIG. 3). The computing device receives a connection request from a first neighbor device utilizing a Wi-Fi Direct (WFD) discovery protocol at block 502.

Then at block 504, the computing device forms a first peer-to-peer (P2P) connection with the first neighbor device utilizing WFD. The computing device is set as the group owner of the first P2P connection. Forming the first P2P connection can include setting a group ownership parameter (e.g., a group ownership intent value) representing a prioritization of whether to elect the computing device as the group owner of the first P2P connection. The group ownership parameter is set to an extremity corresponding to a lowest intent to be elected the group owner.

At block 506, the computing device generates a notice of absence (NoA) schedule to send to the first neighbor device indicating suspension intervals of the first P2P connection during which the computing device is suspended from being the group owner of the first P2P connection. For example, the NoA schedule may be generated based on an existing NoA schedule for a P2P connection of the computing device utilizing WFD other than the first P2P connection.

At block 508, the computing device forms a second P2P connection with a second neighbor device utilizing the WFD protocol. The second P2P connection can be formed once the NoA schedule of the first P2P connection is established. In some embodiments, the second P2P connection can be formed already before the NoA schedule of the first P2P connection is established. This is the case where the NoA schedule of the first P2P connection is based on the NoA schedule of the second P2P connection. The second neighbor device is set as the group owner of the second P2P connection.

Forming the second P2P connection can include determining that a mesh communication network that the computing device is part of is to be expanded and then discovering the second neighbor device during one of the suspension intervals (e.g., after sending of the NoA schedule). The computing device can initiate discovering of neighbor devices, in response to powering on the computing device or to losing a previous P2P connection that utilizes the WFD protocol. The computing device can form the second P2P connection by discovering multiple neighbor devices, comparing the multiple neighbor devices, and then selecting the second neighbor device to form the second P2P connection. For example, comparing the multiple neighbor devices can include comparing network connectivity characteristics (e.g., network speed, network bandwidth, or network proximity to an external network) of the multiple neighbor devices. Selecting the second neighbor device can include selecting based on a network connectivity characteristic of the second neighbor device.

Here, the first P2P connection and the second P2P connection constitute part of the mesh communication network. Hence, when forming the second P2P connection, the computing device can provide a node list of existing members of the mesh communication network to the second neighbor device. The node list identifies at least a chain of computing devices that relays data to one another utilizing at least two WFD groups each with a different designated group owner.

The node list enables a later node in the mesh communication network to route data to different devices in the mesh communication network. For example, the computing device can detect whether the second neighbor device is an access point to an external network or is at least within a wireless range of such access point, and then provide the node list to the second neighbor device to configure the second neighbor device to route data to and from the external network to nodes within the mesh communication network.

Other than the node list, when forming the second P2P connection, the computing device can provide at least a parameter characterizing the suspension intervals of the first P2P connection to the second neighbor device. This enables the second neighbor device to generate a parallel schedule to expand the mesh communication network (by discovering other devices and/or communicating with other devices) without interfering with the time division multiplexing of existing nodes in the mesh communication network.

Then at block 510, during one of the suspension intervals of the first P2P connection, the computing device communicates with the second neighbor device via the second P2P connection. Communicating with the second neighbor device can include forwarding a data packet, received from the first neighbor device via the first P2P connection, to the second neighbor device via the second P2P connection. The data packet can be from an external network or destined for an external network. The data packet can also be from a member node in the mesh communication network or destined for a member node in the mesh communication network.

At block 512, the computing device time multiplexes at least one of the suspension intervals for performing various tasks. For example, block 512 can include time-multiplexing at least one of the suspension intervals to allocate time periods for sending of data packets to the second neighbor device via the second P2P connection and for receiving of data packets from the second neighbor device via the second P2P connection. For another example, block 512 can include time-multiplexing at least one of the suspension intervals to allocate time periods for communicating data packets between the computing device and the second neighbor device via the second P2P connection and discovering a new neighbor device to replace the second neighbor device.

Figure 6:
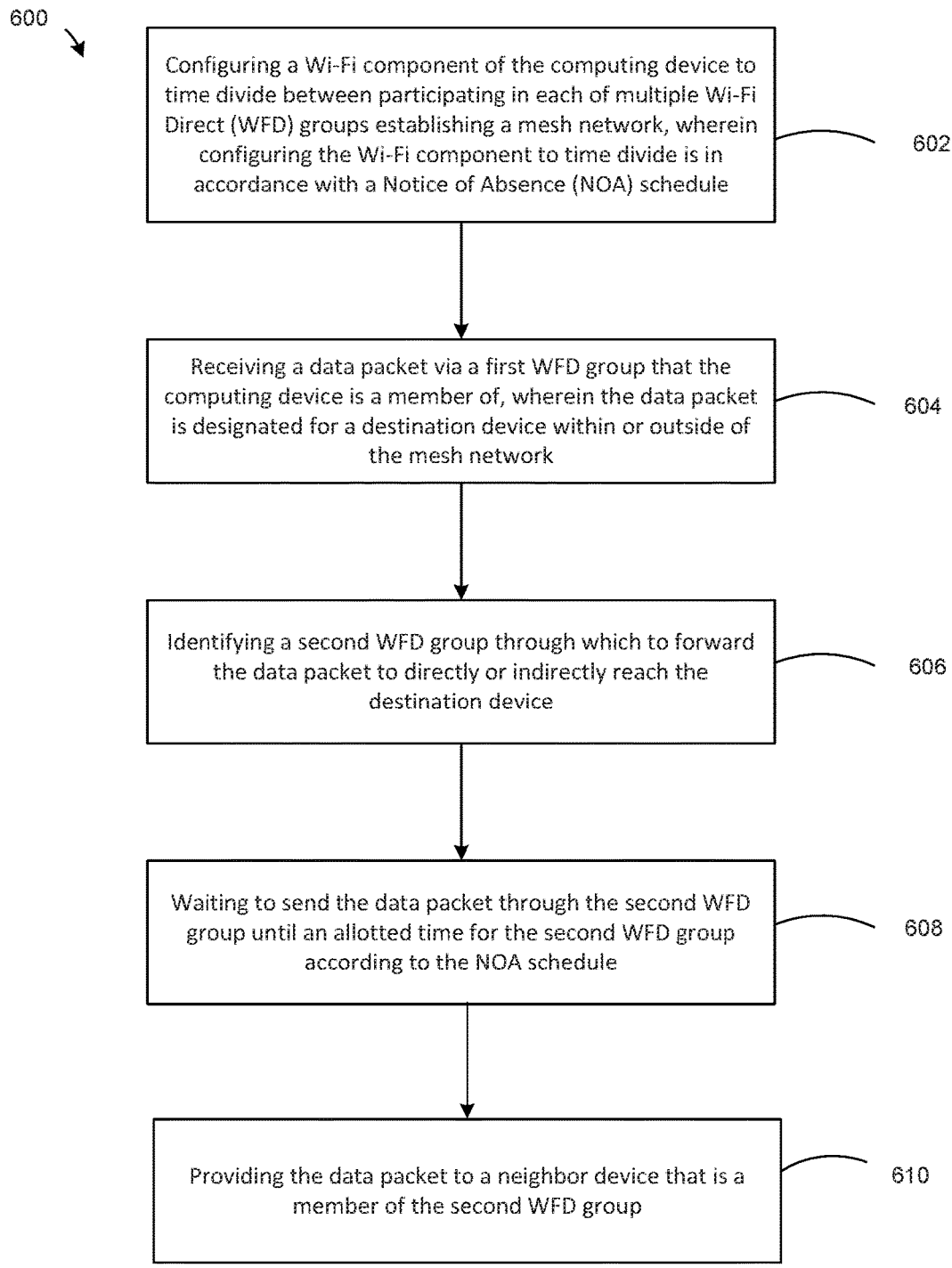
FIG. 6 is a flow chart of a method of operating a mesh network node to communicate data within a P2P mesh network, in accordance with various embodiments.

FIG. 6 is a flow chart of a method 600 of operating a mesh network node (e.g., one of the computing devices 102, 104, or 106 of FIG. 1 or the mesh connection system 300 of FIG. 3) to communicate data within a P2P mesh network, in accordance with various embodiments. The method 600 includes the mesh network node configuring, at block 602, a Wi-Fi component of the mesh network node to time divide between participating in each of multiple Wi-Fi Direct (WFD) groups that establish a mesh network. The Wi-Fi component is configured to time divide in accordance with a NoA schedule. The NoA schedule corresponds to sets of suspension intervals respectively corresponding to the multiple WFD groups. At block 604, the mesh network node receives a data packet via a first WFD group that the computing device is a member of. The data packet may be designated for a destination device within or outside of the mesh network.

At block 606, the mesh network node identifies a second WFD group through which to forward the data packet to directly or indirectly reach the destination device. At block 608, the mesh network node waits to send the data packet through the second WFD group until an allotted time for the second WFD group. The allotted time may be in accordance with the NoA schedule. At block 610, the mesh network node provides the data packet to a neighbor device that is a member of the second WFD group.

While processes or blocks in the figures are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. In addition, while processes or blocks are at times shown as being performed in series, these processes or blocks may instead be performed in parallel, or may be performed at different times.

Figure 7:
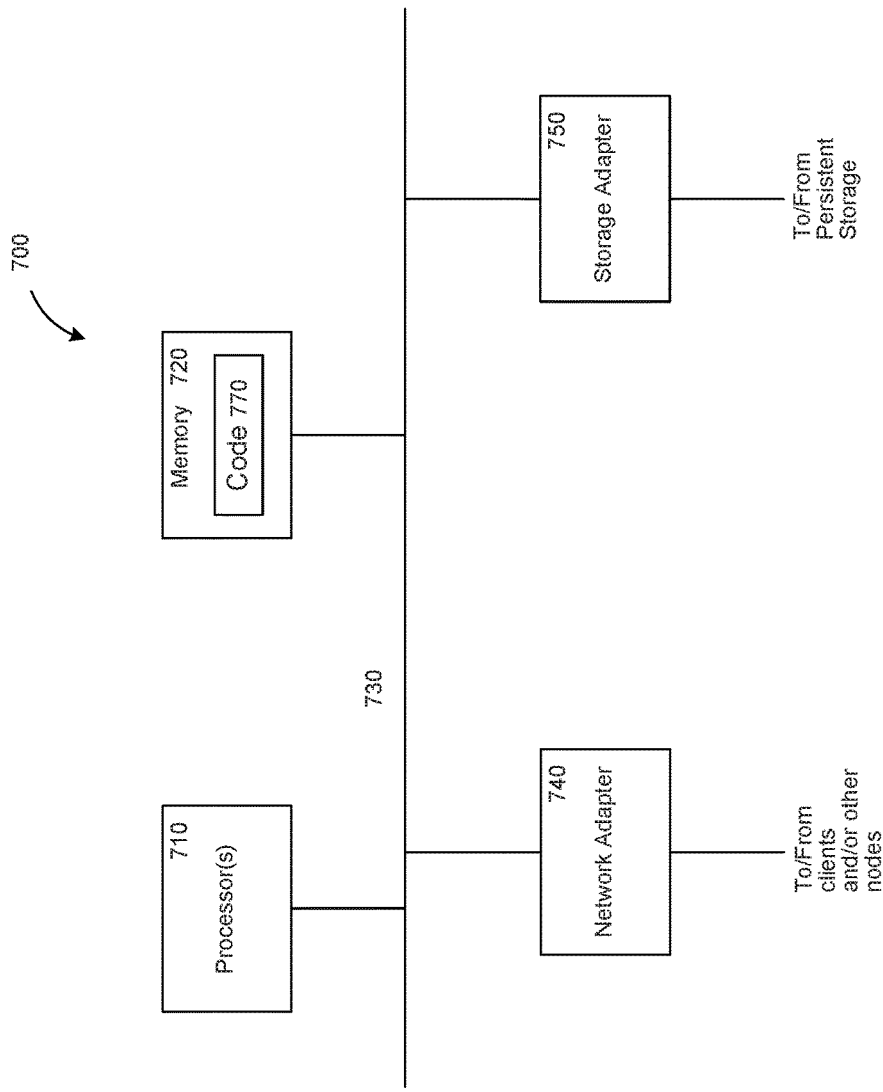
FIG. 7 is a block diagram of an example of a computing device, which may represent one or more computing device or server described herein, in accordance with various embodiments.

FIG. 7 is a block diagram of an example of a computing device 700, which may represent one or more computing device or server described herein, in accordance with various embodiments. The computing device 700 includes one or more processors 710 and memory 720 coupled to an interconnect 730. The interconnect 730 shown in FIG. 7 is an abstraction that represents any one or more separate physical buses, point-to-point connections, or both connected by appropriate bridges, adapters, or controllers. The interconnect 730, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 710 is/are the central processing unit (CPU) of the computing device 700 and thus controls the overall operation of the computing device 700. In certain embodiments, the processor(s) 710 accomplishes this by executing software or firmware stored in memory 720. The processor(s) 710 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 720 is or includes the main memory of the computing device 700. The memory 720 represents any form of random access memory (RAM), read-only memory (ROM), flash memory, or the like, or a combination of such devices. In use, the memory 720 may contain a code 770 containing instructions according to the mesh connection system disclosed herein.

Also connected to the processor(s) 710 through the interconnect 730 are a network adapter 740 and a storage adapter 750. The network adapter 740 provides the computing device 700 with the ability to communicate with remote devices, over a network and may be, for example, an Ethernet adapter or Fibre Channel adapter. The network adapter 740 may also provide the computing device 700 with the ability to communicate with other computers. The storage adapter 750 allows the computing device 700 to access a persistent storage, and may be, for example, a Fibre Channel adapter or SCSI adapter.

The code 770 stored in memory 720 may be implemented as software and/or firmware to program the processor(s) 710 to carry out actions described above. In certain embodiments, such software or firmware may be initially provided to the computing device 700 by downloading it from a remote system through the computing device 700 (e.g., via network adapter 740).

The techniques introduced herein can be implemented by, for example, programmable circuitry (e.g., one or more microprocessors) programmed with software and/or firmware, or entirely in special-purpose hardwired circuitry, or in a combination of such forms. Special-purpose hardwired circuitry may be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable storage medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-recordable media (e.g., read-only memory (ROM); random access memory (RAM); magnetic disk storage media; optical storage media; flash memory devices; etc.), etc.

The term "logic", as used herein, can include, for example, programmable circuitry programmed with specific software and/or firmware, special-purpose hardwired circuitry, or a combination thereof.

Some embodiments of the disclosure have other aspects, elements, features, and steps in addition to or in place of what is described above. These potential additions and replacements are described throughout the rest of the specification.

What is claimed is:

1. A computer-implemented method of operating a computing device, comprising:
configuring a network component coupled to the computing device for dividing time associated with participating in multiple peer to peer (P2P) connections utilizing a Wi-Fi Direct (WFD) discovery protocol, wherein dividing time associated with participating in multiple P2P connections is in accordance with a notice of absence (NoA) schedule that indicates suspension intervals during which the computing device is suspended from being a group owner of a P2P connection in the multiple P2P connections;
receiving, at the computing device, a data packet via a first P2P connection included in the multiple P2P connections, wherein the computing device is a member of the first P2P connection;
identifying, by the computing device, a second P2P connection for forwarding the data packet;
waiting, by the computing device, a time interval for forwarding the data packet through the second P2P connection; and
upon expiration of the time interval, providing the data packet by the computing device to a neighbor device that is a member of the second P2P connection.

2. The computer-implemented method of claim 1, wherein the multiple P2P connections form part of a mesh communication network.

3. The computer-implemented method of claim 1, wherein the computing device is a member of the first P2P connection.

4. The computer-implemented method of claim 1, wherein the data packet is designated for a destination device, wherein the destination device and the computing device are included in a mesh communication network.

5. The computer-implemented method of claim 1, wherein the data packet is designated for a destination device, wherein the computing device is included in a mesh communication network and the destination device is outside the mesh communication network.

6. The computer-implemented method of claim 1, wherein the data packet is directly or indirectly forwarded through the second P2P connection.

7. The computer-implemented method of claim 1, wherein the time interval is in accordance with a notice of absence (NoA) schedule that indicates suspension intervals during which the computing device is suspended from being a group owner of a P2P connection in the multiple P2P connections.

8. A non-transitory computer-readable storage medium storing instructions configured to cause at least one computing device to perform a method comprising:
   configuring a network component coupled to the computing device for dividing time associated with participating in multiple peer to peer (P2P) connections utilizing a Wi-Fi Direct (WFD) discovery protocol, wherein dividing time associated with participating in multiple P2P connections is in accordance with a notice of absence (NoA) schedule that indicates suspension intervals during which the computing device is suspended from being a group owner of a P2P connection in the multiple P2P connections;
   receiving, at the computing device, a data packet via a first P2P connection included in the multiple P2P connections, wherein the computing device is a member of the first P2P connection;
   identifying, by the computing device, a second P2P connection for forwarding the data packet;
   waiting, by the computing device, a time interval for forwarding the data packet through the second P2P connection; and
   upon expiration of the time interval, providing the data packet by the computing device to a neighbor device that is a member of the second P2P connection.

9. The computer-readable storage medium of claim 8, wherein the multiple P2P connections form part of a mesh communication network.

10. The computer-readable storage medium of claim 8, wherein the computing device is a member of the first P2P connection.

11. The computer-readable storage medium of claim 8, wherein the data packet is designated for a destination device, wherein the destination device and the computing device are included in a mesh communication network.

12. The computer-readable storage medium of claim 8, wherein the data packet is designated for a destination device, wherein the computing device is included in a mesh communication network and the destination device is outside the mesh communication network.

13. The computer-readable storage medium of claim 8, wherein the data packet is directly or indirectly forwarded through the second P2P connection.

14. The computer-readable storage medium of claim 8, wherein the time interval is in accordance with a notice of absence (NoA) schedule that indicates suspension intervals during which the computing device is suspended from being a group owner of a P2P connection in the multiple P2P connections.

15. A computing device comprising:
   at least one processor and
   at least one memory comprising instructions configured to cause the at least one processor to perform a method comprising:
   configuring a network component coupled to the computing device for dividing time associated with participating in multiple peer to peer (P2P) connections utilizing a Wi-Fi Direct (WFD) discovery protocol, wherein dividing time associated with participating in multiple P2P connections is in accordance with a notice of absence (NoA) schedule that indicates suspension intervals during which the computing device is suspended from being a group owner of a P2P connection in the multiple P2P connections;
   receiving, at the computing device, a data packet via a first P2P connection included in the multiple P2P connections, wherein the computing device is a member of the first P2P connection;
   identifying, by the computing device, a second P2P connection for forwarding the data packet;
   waiting, by the computing device, a time interval for forwarding the data packet through the second P2P connection; and
   upon expiration of the time interval, providing the data packet by the computing device to a neighbor device that is a member of the second P2P connection.

16. The system of claim 15, wherein the data packet is designated for a destination device, wherein the computing device is included in a mesh communication network and the destination device is outside the mesh communication network.

17. The system of claim 15, wherein the data packet is directly or indirectly forwarded through the second P2P connection.

* * * * *